United States Patent
Tsuchiya (10) Patent No.: US 6,188,434 B1
(45) Date of Patent: Feb. 13, 2001

(54) APPARATUS AND METHOD FOR CONTROLLING EXPOSURE IN A COLOR IMAGE PICKUP DEVICE

(75) Inventor: Takashi Tsuchiya, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 08/827,652

(22) Filed: Apr. 10, 1997

(30) Foreign Application Priority Data

Apr. 12, 1996 (JP) .................................................. 8-091596

(51) Int. Cl.⁷ .......................... G03B 13/00; H04N 5/238; H04N 5/235
(52) U.S. Cl. .......................... 348/347; 348/364; 348/229
(58) Field of Search ................................. 348/229, 230, 348/234, 347, 362, 363, 364, 365, 366, 221, 224, 652

(56) References Cited

U.S. PATENT DOCUMENTS

| | | |
|---|---|---|
| 4,506,293 | 3/1985 | Hurst, Jr. . |
| 4,969,045 * | 11/1990 | Haruki et al. ........................ 348/229 |
| 4,987,482 * | 1/1991 | Imai et al. ........................... 348/652 |
| 5,049,997 | 9/1991 | Arai ................................. 358/213.11 |
| 5,065,247 * | 11/1991 | Haruki ................................. 348/364 |
| 5,079,622 * | 1/1992 | Toshinobu ............................ 348/229 |
| 5,093,716 * | 3/1992 | Kondo et al. ........................ 348/229 |
| 5,111,301 * | 5/1992 | Haruki et al. ....................... 348/364 |
| 5,353,058 | 10/1994 | Takei .................................. 348/363 |
| 5,585,844 * | 12/1996 | Hieda et al. ......................... 348/229 |
| 5,703,644 * | 12/1997 | Mori et al. ........................... 348/363 |

FOREIGN PATENT DOCUMENTS 0 552 016   7/1993   (EP) .

OTHER PUBLICATIONS

Patent Abstracts of Japan, vol. 015, No. 375 (E–1114), Sep. 20, 1991 & JP 03 148987 A (Minolta Camera Co Ltd), Jun. 25, 1991.

* cited by examiner

Primary Examiner—Wendy Garber
Assistant Examiner—Luong Nguyen
(74) Attorney, Agent, or Firm—Frommer Lawrence & Haug, LLP.; William S. Frommer; Dennis M. Smid (57) ABSTRACT

An image pickup apparatus and method for controlling an exposure so as to maintain proper brightness for a target or desired object regardless of the background brightness. Such image pickup apparatus may include a level sensing unit having a number of level sensing or detecting devices including a first level sensing device for sensing an imaging output level of a specific luminance level area on an imaged screen and a second level sensing device for sensing an imaging output level of a skin tone area on the imaged screen. The image pickup apparatus may further include a control device for controlling the quantity of light received in an image pickup unit in accordance with the sensed or detected output levels. Additionally, the present color image pickup apparatus may be operable in a plurality of exposure modes in accordance with the imaging condition. As a result, an imaging output may be provided which has relatively high or excellent image quality.

3 Claims, 6 Drawing Sheets

APPARATUS AND METHOD FOR CONTROLLING EXPOSURE IN A COLOR IMAGE PICKUP DEVICE

BACKGROUND OF THE INVENTION

The present invention relates to an apparatus and method for automatically controlling a quantity of light received in an image pickup device.

An image pickup device should provide a proper light exposure so as to obtain an image with a relatively high or excellent quality. Such image pickup device may sense a signal level of a picked-up image and automatically control an iris diaphragm of the image pickup device in accordance with the sensed signal level. However, in sensing or detecting such signal level, the image pickup device may sense the signal level of the entire or overall image which may include the background thereof. As a result, the aperture value of the color image pickup device is influenced by such sensed signal level. As such, the signal level due to the picked-up background image may obstruct or adversely affect the proper aperture value for a desired target object. In other words, the brightness of the background may hinder obtaining a proper brightness condition for the target object. For example, a target object may be made shadowed in a backlighted condition, and subject to halation in an excessively lighted condition.

Further, to provide a correct exposure, the image pickup device may perform automatic iris control which changes an interior divisional ratio of a peak value to an average luminance level of an overall screen for shifting a target value to a bright or a dark side. Such control may produce an adverse effect on the aperture value of a highly luminous portion however long the area may be. Moreover, the difference between the peak value and the average luminance level may be relatively small and may result in a disadvantageous restriction in the amount of shifting.

Furthermore, as previously described, the image pickup device may perform iris control for the overall screen. As such, the image pickup device may not provide a proper aperture value for a specific area of the screen.

OBJECTS AND SUMMARY OF THE INVENTION

An object of the present invention is to provide an apparatus and method for controlling the light exposure of a color image pickup device so as to provide a proper brightness of a target object independently of the brightness of the background so as to produce an image having a relatively high quality.

Another object of the present invention is to provide an apparatus and method as aforesaid which provides a plurality of modes for controlling light exposure in which a control exposure mode may be selected in accordance with an imaging condition so as to produce a relatively high quality image.

In accordance with an aspect of the present invention, a color image pick-up apparatus is provided which comprises an image pick-up unit having a device for receiving light representative of an image, a device for converting light into a number of light signals, and a device for controlling the amount of the light which is to be converted into the light signals in accordance with a control signal; a processing device for processing the light signals in a predetermined manner; and a control signal generating device including a luminance converter and a plurality of determining devices for receiving the processed light signals and for generating the control signal therefrom.

The present color image pickup device may include a control device and a level sensing unit having a number of level sensing devices such as a first level sensing device and a second level sensing device. The first level sensing device operates to sense a signal level of an area of a specific luminance level specified by a first area generating device and contained in a luminance signal supplied from a luminance converting device (which converts a color imaging signal obtained by a color image pickup unit to the luminance signal). The second level sensing device operates to sense a signal level of a skin tone area specified by a second area generating device and contained in the luminance signal supplied from the luminance converting device. The control device operates to control the quantity of light received in the color image pickup unit so that the sensed output or first average signal level obtained by the first level sensing device, the sensed output or second average signal level obtained by the second level sensing device or a middle signal level between the first average signal level and the second average signal level is set at a predetermined level. The control device may further operate to adjust an interior divisional point between the first average signal level and the second average signal level to the middle signal level and an area ratio of the area of the specific luminance level to the skin tone area to an interior divisional ratio.

Other objects, features and advantages according to the present invention will become apparent from the following detailed description of illustrated embodiments when read in connection with the accompanying drawings in which corresponding components are identified by the same reference numerals.

DESCRIPTION OF THE PREFERRED EMBODIMENTS

Preferred embodiments of the present invention will now be described with reference to the accompanying drawings.

Figure 1:
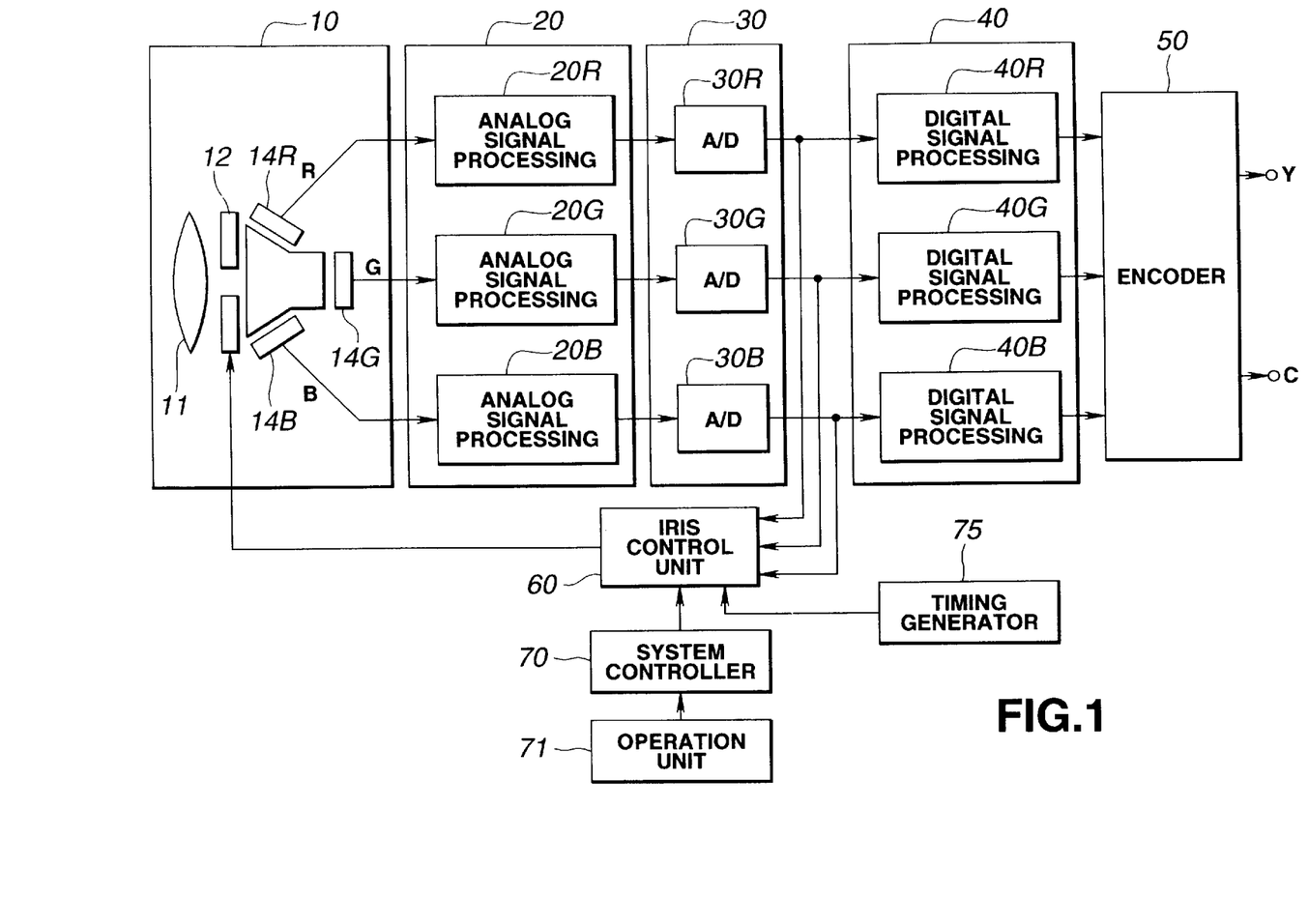
FIG. 1 is a diagram of a color image pickup apparatus according to an embodiment of the present invention.

FIG. 1 illustrates a color image pickup apparatus 1. Such color image pickup apparatus may include an image pickup unit 10, an analog signal processing unit 20, an analog-todigital (A/D) converting unit 30, a digital signal processing unit 40, an encoder 50, a control unit 60, a system controller 70, a timing generator 75, and an operation unit 71, which may be arranged as shown in FIG. 1.

The image pickup unit 10 may be a color image pickup unit and may include an imaging lens 11, an iris diaphragm 12, a color separating prism 13, and CCDs or charge-coupled image sensors 14R, 14G, and 14B. Such color image pickup unit may be adapted to receive an imaging light, control the quantity of light, and separate such light into light components. More specifically, an imaging light may be received by the imaging lens 11 and supplied therefrom through the iris diaphragm 12 to the color separating prism 13, whereupon the imaging light may be separated into three primary color light components, that is, a red component, a green component, and a blue component. Such red, green, and blue light components may be respectively supplied to the image sensors 14R, 14G and 14B so as to form color imaging signals R, G, and B. The iris diaphragm 12 may be operated or controlled so as to control the quantity of light supplied therethrough in a manner as hereinafter more fully described.

The color imaging signals R, G, and B from the image sensors 14R, 14G, and 14B may be respectively supplied to analog signal processing circuits 20R, 20G, and 20B of the analog signal processing unit 20, wherein predetermined analog signal processing may be performed. Such processing may include various types of level controls such as noise removal performed by correlated double sampling (CDS), gain control, black balance, white balance, shading correction, and so forth.

The processed color imaging signals from the analog signal processing circuits 20R, 20G, and 20B of the analog signal processing unit 20 may be respectively supplied to analog-to-digital (A/D) converters 30R, 30G, and 30B of the A/D converting unit 30. Such A/D converters may convert the received analog color imaging signals to digital signals at a predetermined clock rate which may be substantially equal to the sampling rate of the analog color imaging signals R, G or B and which may be synchronous to a driving clock signal. The R, G, and B digital color signals from the A/D converters 30R, 30G, and 30B may be supplied to the digital signal processing unit 40 and the iris control unit 60.

The digital signal processing unit 40 may include digital signal processing circuits 40R, 40G, and 40B which may respectively receive the R, G, and B digital color signals from the A/D converters 30R, 30G, and 30B and which may subject the received signals to predetermined processing. Such processing may be nonlinear type processing and may include picture emphasis, pedestal addition, gamma correction and knee correction and so forth. Processed signals from the digital signal processing unit 40 may be supplied to the encoder 50 wherein a matrix operation may be performed so as to generate therefrom a digital luminance signal Y and two digital color difference signals $C_R$ and $C_B$. A luminance signal Y and a chromatic signal C may be generated from the digital luminance signal Y and digital color difference signals CR and C. in accordance with a NTSC or PAL standard or the like and supplied from the encoder 50.

The iris control unit 60 is adapted to receive the R, G, and B digital color signals from the A/D converters 30R, 30G, and 30B and to process the same so as to form a control signal which may be supplied to the iris diaphragm 12 of the color image pickup unit 10 so as to control the amount of light passing therethrough. In other words, the iris control unit 60 may sense an output level of an image picked up by the color image pickup unit 10 and may control the quantity of light in the color image pickup unit.

The timing generator 75 is adapted to provide clock and/or timing signals to the control unit 60. The system controller 70 may supply output signals, such as level setting signals, to the iris control unit 60 in response to input signals received from the operation unit 71. The operation panel or unit 71 may receive input commands such as from an operator and, in response thereto, may generate input signals and supply the same to the system controller 70, whereupon the system controller may operate in accordance with such signals.

Figure 2:
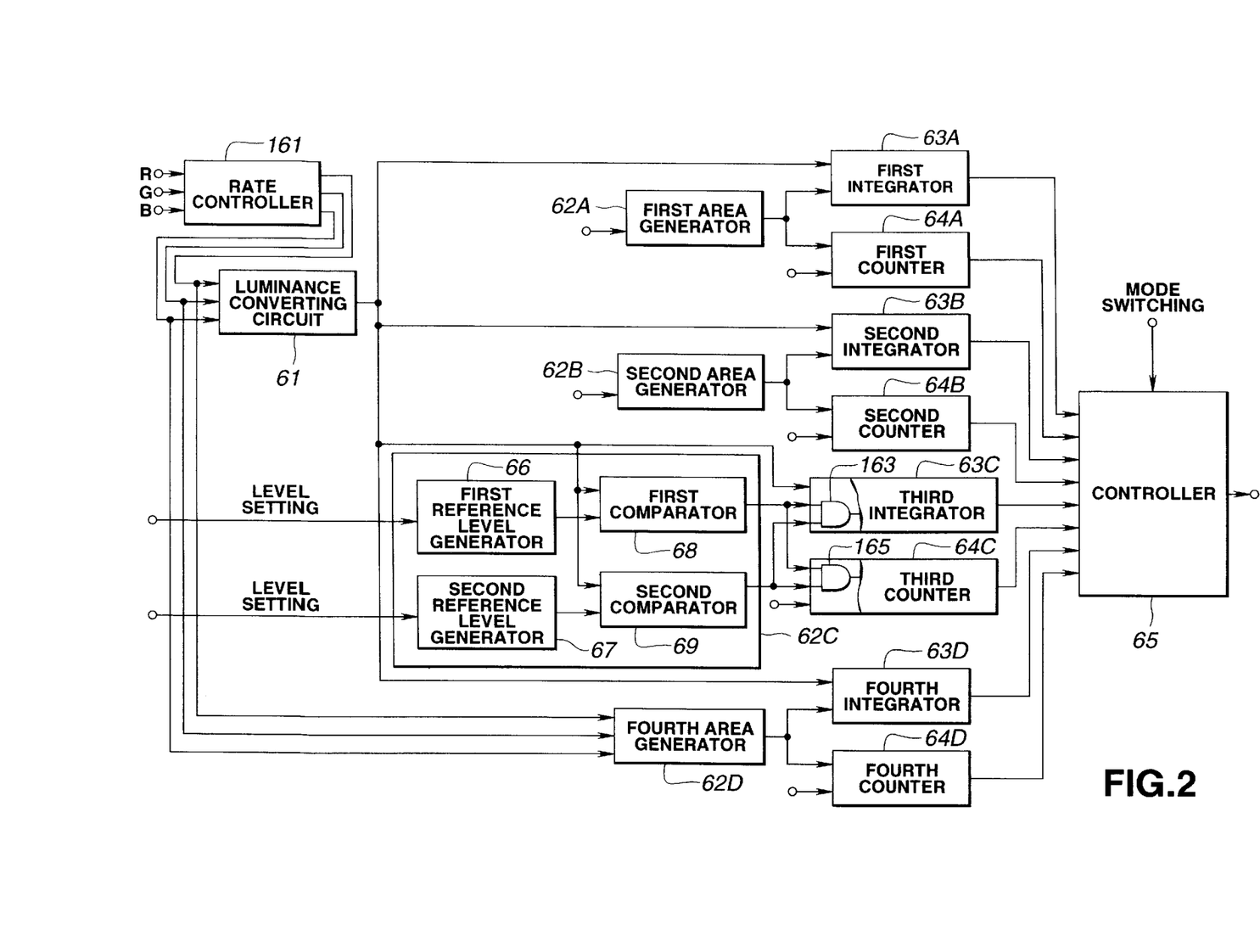
FIG. 2 is a diagram of a control unit included in the color image pickup apparatus of FIG. 1.

The iris control unit 60 may be arranged as shown in FIG. 2. That is, the iris control unit 60 may include a down rate converter 161, a luminance converting circuit 61, first to fourth area generators 62A to 62D, first to fourth integrator 63A to 63D, first to fourth counters 64A to 64D, and a controller 65, which may be arranged as shown in FIG. 2. The R, G, and B digital color signals from the A/D converters 30R, 30G, and 30B may be supplied to the down rate converter 161 so as to reduce the sampling rate. Rate converted RGB digital color signals from the down rate converter 161 may be supplied to the luminance converting circuit 61 and the fourth area generator 62D. The luminance converting circuit 61 is adapted to convert the received signals (which are obtained from the color imaging signals supplied by the color imaging unit 10) into a luminance signal Y and to supply the same to the third area generator 62C and the first to fourth integrator 63A. to 63D. As hereinbelow more fully described, the first to fourth area generators 62A to 62D may generate gate pulses which correspond to specific areas of an imaged screen and supply the same to the first to fourth integrator 63A to 63D and the first to fourth counters 64A to 64D, respectively.

That is, the first area generator 62A is adapted to generate a gate pulse(s) corresponding to the overall or entire imaged screen and to supply the same to the first integrator 63A and the first counter 64A. As such, the "specific area" associated with the first area generator 62A is the overall or entire imaged screen. The first area generator 62A may operate in accordance with a timing signal supplied from the timing generator 75 (FIG. 1).

The second area generator 62B is adapted to generate a gate pulse(s) corresponding to a rectangle area or spot located at the center of the imaged screen and to supply the same to the second integrator 63B and the second counter 64B. As such, the "specific area" associated with the second area generator 62B is the rectangle area or spot located at the center of the imaged screen. The second area generator 62B may operate in accordance with a timing signal supplied from the timing generator 75 (FIG. 1).

The third area generator 62C is adapted to generate first and second gate pulses for a specific luminance level area of the imaged screen and to supply the same to the third integrator 63C and the third counter 64C. More specifically, the third area generator 62C may include first and second reference level generators 66 and 67, and first and second level comparators 68 and 69. The first reference level generator 66 may generate a reference upper limit level IRSHI in accordance with a level setting signal from the system controller 70 (FIG. 1) and may supply the same to the first level comparator 68 which may also receive the digital luminance signal Y from the luminance converting circuit 61. The first level comparator 68 may compare the magnitude of the received reference upper limit level IRSHI to the digital luminance signal Y and may supply an output therefrom in accordance with the results of such comparison. For example, if the results of the comparison indicate that the digital luminance signal Y is equal to or lower than the reference upper limit level IRSHI, the comparator 68 may output a first luminance gate pulse. In a similar manner, the second reference level generator 67 may generate a reference lower limit level IRSLO in accordance with a level setting signal from the system controller 70 (FIG. 1) and may supply the same to the second level comparator 69 which may also receive the digital luminance signal Y from the luminance converting circuit 61. The second level comparator 69 may compare the magnitude of the reference lower limit level IRSLO to the digital luminance signal Y and may supply an output therefrom in accordance with the results of such comparison. For example, if the results of the comparison indicate that the digital luminance signal Y is greater than or equal to the reference lower limit level IRSLO, the comparator 69 may output a second luminance gate pulse. Further, the reference upper limit level IRSHI and the reference lower limit level IRSLO generated by the first and the second reference level generators 66 and 67 may be varied by varying the level setting signals from the system controller 70.

The fourth area generator 62D is adapted to decode the rate converted RGB digital color signals from the down rate converter 161 so as to generate a gate pulse(s) for a skin tone or color area of the imaged screen and to supply the same to the fourth integrator 63D and the fourth counter 64D. As such, the "specific area" associated with the fourth area generator 62D is the respective skin tone or color area of the imaged screen.

The first to fourth integrator 63A to 63D are adapted to integrate the digital luminance signal Y from the luminance converting circuit 61 within the respective specific area based on the gate pulses for the specific area from the first to fourth area generators 62A to 62D and to supply such integrated or integral value(s) to the controller 65. More specifically, the first integrator 63A may integrate the digital luminance signal Y over the overall imaged screen and supply the integral value to the controller 65. The second integrator 63B may integrate the digital luminance signal Y over the rectangular (SPOT) area located at the center of the imaged screen and supply the integral value to the controller 65. The third integrator 63C may include an AND gate 163 which receives the first and second luminance gate pulses from the comparators 68 and 69 and supplies an output signal therefrom. Additionally, the third integrator 63C may integrate the digital luminance signal Y over a specific luminance level area of the imaged screen and supply the integral value to the controller 65. The fourth integrator 63D may integrate the digital luminance signal Y over the respective skin tone or color area of the imaged screen and supply the integral value to the controller 65.

The first to fourth counters 64A to 64D are adapted to respectively count the number of pixels in each specific area based on the gate pulse for each specific area of the imaged screen generated by the first to fourth area generators 62A to 62D and to supply such count value(s) to the controller 65. More specifically, the first counter 64A receives the gate pulse signal from the first area generator 62A and a clock signal from the timing generator 75 (FIG. 1), counts the number of pixels in the overall imaged screen, and supplies the counted value to the controller 65. The second counter 64B receives the gate pulse signal from the second area generator 62B and a clock signal from the timing generator 75 (FIG. 1), counts the number of pixels in the rectangular (SPOT) area located in the center of the imaged screen, and supplies the counted value to the controller 65. The third counter 64C may include an AND gate 165 which receives the first and second luminance gate pulses from the comparators 68 and 69 and supplies an output signal therefrom. Additionally, the third counter 64C may receive a clock signal from the timing generator 75 (FIG. 1), count the number of pixels in a specific luminance level area of the imaged screen, and supply the counted value to the controller 65. The fourth counter 64D receives the gate pulse signal from the fourth area generator 62D and a clock signal from the timing generator 75 (FIG. 1), counts the number of pixels in the skin tone or color area of the imaged screen, and supplies the counted value to the controller 65.

The controller 65 may be operable in a number of modes such as a so-called full-screen mode, a spot mode, a luminance gate mode, a skin tone mode, and an intelligent mode. An operation mode of the controller 65 may be selected in accordance with a mode switching signal from the system controller 70 (FIG. 1) which, in turn, may be obtained in response to an operation input supplied from the operation unit 71 (FIG. 1). The controller 65 may be operable in the desired mode in accordance with the integral value of the digital luminance signal Y of the specific area supplied by the appropriate one of the first to fourth integrator 63A to 63D and the count value indicative of the number of the pixels of the respective specific area supplied by the corresponding one of the first to fourth counters 64A to 64D, as hereinbelow more fully described.

In the full-screen mode, the controller 65 may generate a control signal in accordance with the digital luminance signal Y integrated over the overall imaged screen supplied from the first integrator 63A and the number of pixels (or count value) of the overall imaged screen supplied from the first counter 64A. Such control signal may be supplied to the iris diaphragm 12 of the image pickup unit 10 (FIG. 1) to control the same so as to cause an average picture level (APL) of the overall imaged screen to be derived and the average picture level to be adjusted to a predetermined level.

Figure 6:
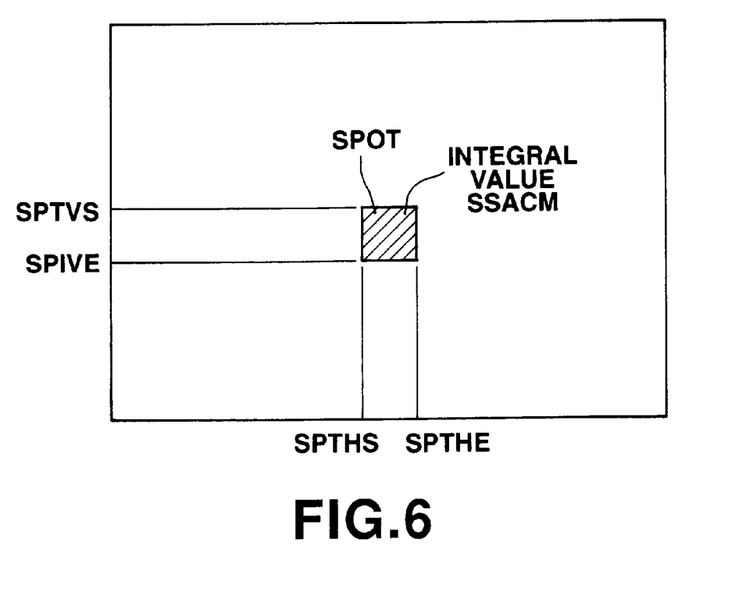
FIG. 6 is a diagram to which reference will be made in explaining a spot mode.

In the spot mode, the controller 65 may generate a control signal in accordance with the digital luminance signal Y integrated over the rectangular (SPOT) area located at the center of the imaged screen (or integral value SSACM) supplied from the second integrator 63B and the number of pixels (or count value) of the rectangular (SPOT) area of the imaged screen supplied from the second counter 64B. Such control signal may be supplied to the iris diaphragm 12 of the image pickup unit 10 (FIG. 1) to control the same so as to cause an average picture level PSPT of the rectangular (SPOT) area to be derived and the average picture level to be adjusted to a predetermined level. In such spot mode, the input signal may be gated and outputted as a sensing or detected signal. Further, and with reference to FIG. 6, the average picture level PSPT in the spot mode may be derived from a horizontal start position SPTHS, a horizontal end position SPTHE, a vertical start position SPTVS, and a vertical end position SPTVE in accordance with the following expression:

$$P_{SPT} = SSACM/k(SPTHE-SPTHS)(SPHTVE-SPTVS)$$

in which k represents a coefficient (such as 4) which may correspond to the rate conversion or rate reduction of the digital luminance signal Y.

Figure 3:
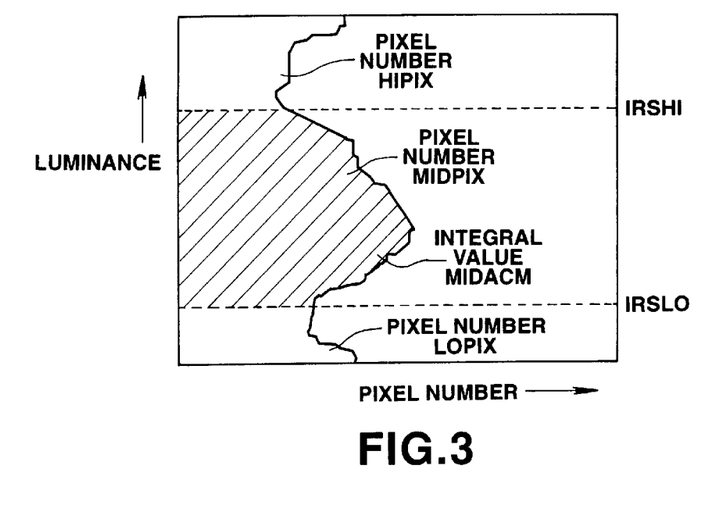
FIG. 3 is a diagram to which reference will be made in explaining a luminance gate mode.

In the luminance gate mode, the controller 65 may generate a control signal in accordance with the digital luminance signal Y integrated over the specific luminance level area of the imaged screen (or integral value MIDACM) supplied from the third integrator 63C and the number of pixels (MIDPIX) or count value of the specific luminance level area of the imaged screen supplied from the third counter 64C. Such control signal may be supplied to the iris diaphragm 12 of the image pickup unit 10 (FIG. 1) to control the same so as to cause an average picture level $P_{MID}$ of the area of the specific luminance level to be derived and the average picture level to be adjusted to a predetermined level. In such luminance gate mode, the luminance signal may be gated and outputted as a detected signal. Further, and with reference to FIG. 3, in the luminance gate mode, the system controller 70 may specify an upper luminance limit IRSHI and a lower luminance limit IRSLO so as to obtain an average picture level $P_{MID}$ of a specific area (wherein only pixels having a luminance level within the specific luminance level limits are included) which may be represented by the following expression:

$$P_{MID}=MIDACM/MIDPIX$$

Figure 4A:
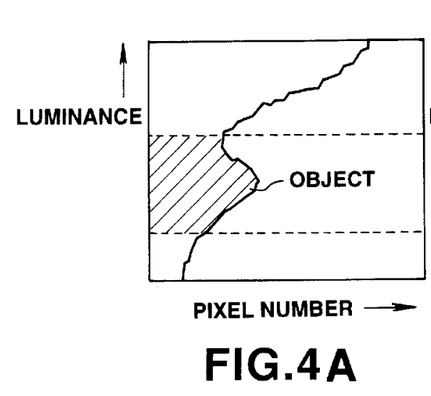
FIGS. 4A and 4B are diagrams to which reference will be made in further explaining the luminance gate mode.
Figure 4B:
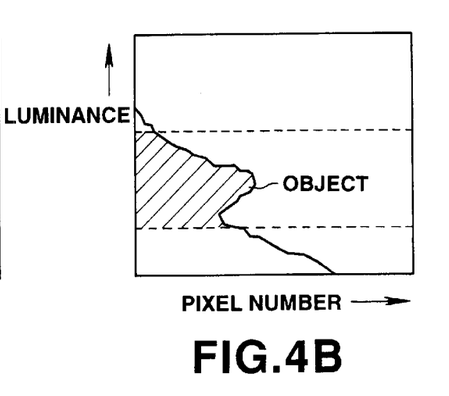

In the luminance gate mode, as shown in FIGS. 4A and 4B, the iris value may not be influenced by a portion that is brighter or gloomier than that of the specified brightness range which may be close to the brightness of the object. As a result, backlight, excessive light, or illumination due to the sun and so forth onto the screen may not cause shadow or halation on the target object. Additionally, if the lighting condition is changed such as when an operator goes outdoors or indoors, a signal between the IRSHI and IRSLO levels may not be produced, whereupon control may not be provided. However, the change of the lighting condition may be determined by checking the number of pixels HIPIX/MIDPIX/LOPIX of each luminance level. As an example, in such situation, if the value HIPIX is much larger than the value of MIDPIX or LOPIX, the iris diaphragm 12 may be opened too much.

Figure 5:
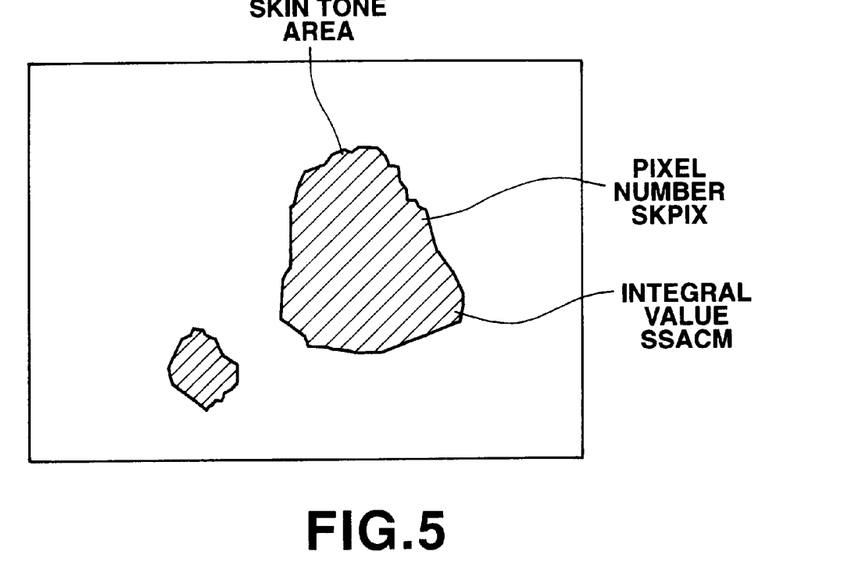
FIG. 5 is a diagram to which reference will be made in explaining a skin tone or color mode.

In the skin tone mode, and with reference to FIG. 5, the controller 65 may generate a control signal in accordance with the digital luminance signal Y integrated over the skin tone or color area of the imaged screen (or integral value SSACM) supplied from the fourth integrator 63D and the count value or number of pixels (SKPIX) of the skin tone or color area of the imaged screen supplied from the fourth counter 64D. Such control signal may be supplied to the iris diaphragm 12 of the image pickup unit 10 (FIG. 1) to control the same so as to cause an average picture level $P_{SKN}$ of the skin tone area to be derived and the average picture level $P_{SKN}$ to be adjusted to a predetermined level. Such average picture level $P_{SKN}$ may be represented by the following expression:

$$P_{SKN}=SSACM/SKPIX$$

In the skin tone mode, the input signal may be gated and outputted as a detected signal.

Figure 7:
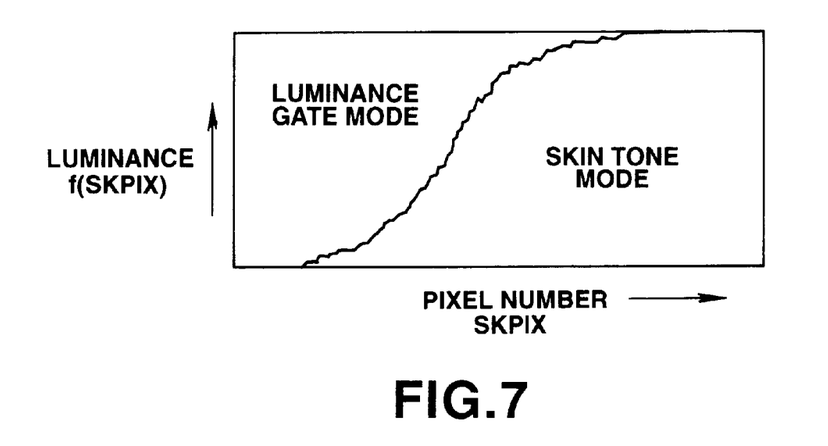
FIG. 7 is a diagram to which reference will be made in explaining an intelligent mode.

The intelligent mode is a combination of the luminance gate mode and the skin tone mode. In the intelligent mode, the controller 65 may generate a control signal in accordance with integrated values from the third and fourth integrator 63C and 63D and count values (or the number of pixels) from the third and fourth counters 64C and 64D. Such control signal may be supplied to the iris diaphragm 12 of the image pickup unit 10 (FIG. 1) to control the same so as to cause a middle value or average picture level $P_{INT}$ between the average picture level $P_{MID}$ of the specific level area of the luminance gate mode and the average picture level $P_{SKN}$ of the skin tone mode to be derived and the middle picture level $P_{INT}$ to be adjusted to a predetermined level. In other words, such intelligent mode may be formed by combining or mixing the luminance gate mode and the skin tone mode in a desired or selected ratio. Such mixing ratio may be changed in accordance with the pixel numbers associated with one or both modes, such as those of the skin tone area (SKPIX). For example, and with reference to FIG. 7, the mixing ratio may be changed such that the luminance gate mode accounts for a lesser portion or percentage of the intelligent mode as the pixel numbers of the skin tone area increase. The average picture level $P_{INT}$ of the intelligent mode may be obtained by the following expressions:

$$W_{SKN}=f(SKPIX)$$

$$W_{MID}+W_{SKN}=1$$

$$P_{INT}=W_{MID}P_{MID}+W_{SKN}P_{SKN}$$

in which $W_{MID}$ and $W_{SKN}$ respectively represent weighted factors for the luminance gate mode and the skin tone mode, and f(SKPIX) represents a weighting function for the skin tone mode.

Figure 8:
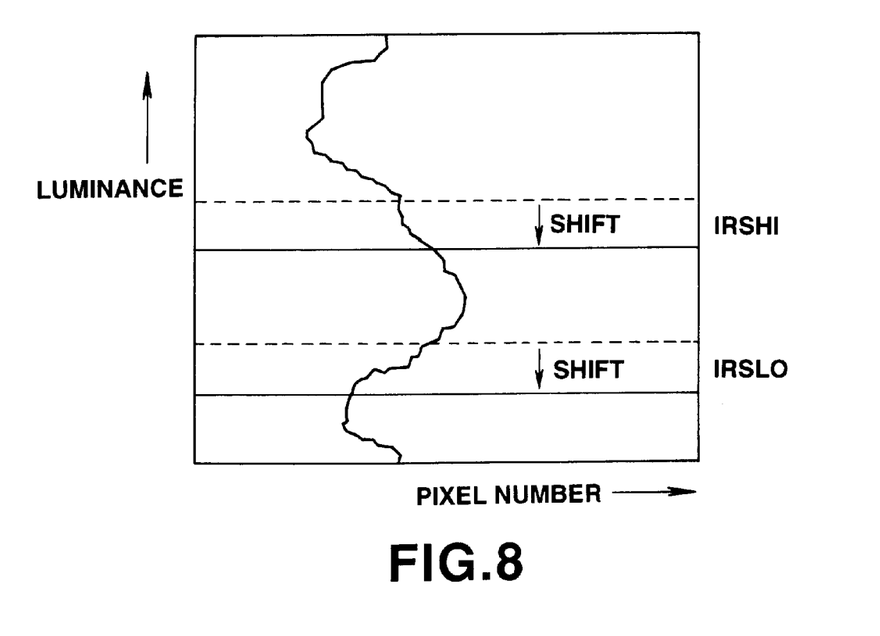
FIG. 8 is a diagram to which reference will be made in further explaining the intelligent mode.

Returning to FIGS. 1 and 2, in response to the operation of an up-down switch located on the operation panel 71, the system controller 70 may supply level setting signals to the first and the second reference level generators 66 and 67 so as to cause one or both of the upper luminance limit IRSHI and the lower luminance limit IRSLO of the luminance gate mode to be shifted. Such operation may enable fine tuning of the automatic iris control. For example, if the luminance range is shifted downward (as shown in FIG. 8) such that the screen is made darker or gloomier, the automatic iris control may cause the iris 12 to open. As such, "a bit brighter" result may be obtained.

Figure 10:
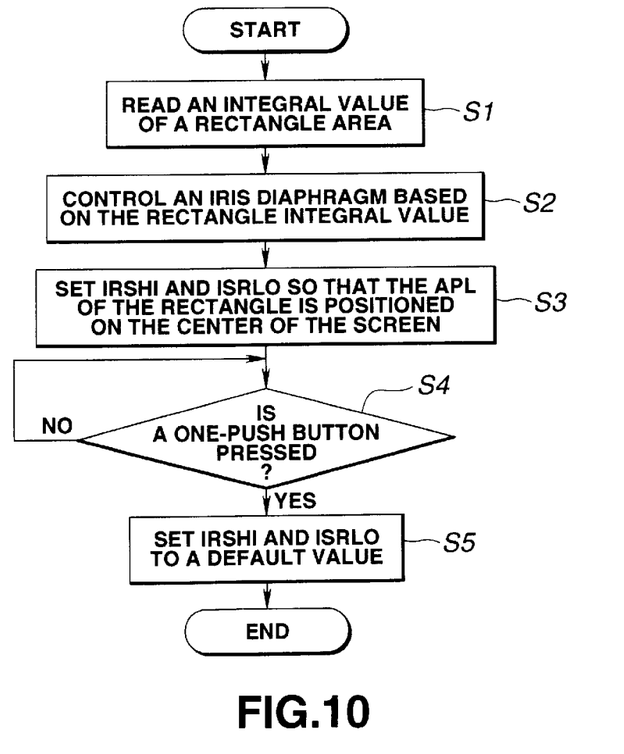
FIG. 10 is a flowchart to which reference will be made in further explaining the one-push operation.

Further, in response to the operation of the one-push button located on the operation panel 71, the system controller 70 may cause the upper luminance limit IRSHI and the lower luminance limit IRSLO of the luminance gate mode to be reset in accordance with the procedure shown in FIG. 10, as hereinbelow more fully described.

In step S1, the system controller 70 may set the spot mode to one field period and obtain the average picture level $P_{SPT}$ for the rectangular (SPOT) area located in the center of the imaged screen in response to an input from the one-push button due to the activation of the same.

Figure 9A:
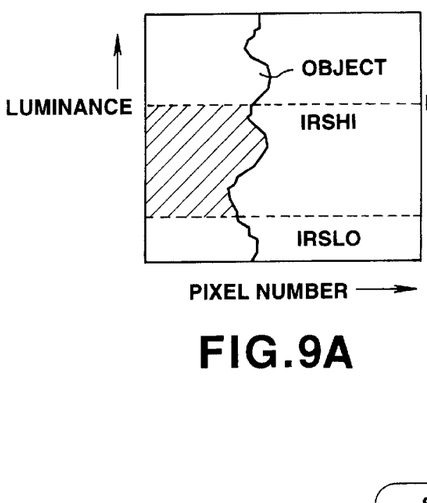
FIGS. 9A and 9B are diagrams to which reference will be made in explaining a one-push operation of the intelligent mode.
Figure 9B:
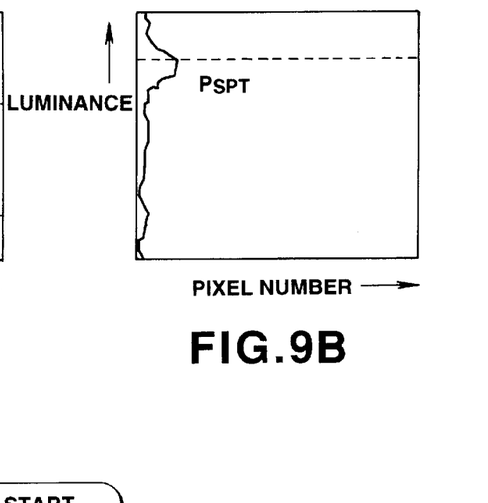

Processing may then proceed to step S2, wherein the iris diaphragm 12 of the image pickup unit 10 may be controlled in accordance with a value obtained in step S1 and wherein the average picture level $P_{SPT}$ may be adjusted to a predetermined level. An example of a luminance distribution of an imaged screen before and after the operation of the one-push button is illustrated in FIGS. 9A and 9B.

Processing may then proceed to step S3, wherein the upper luminance limit IRSHI and the lower luminance limit IRSLO of the luminance gate mode may be rearranged or reset as indicated below so that the average picture level $P_{SPT}$ of the rectangular (SPOT) area is located at the center of the imaged screen:

$$IRSHI=P_{SPT}+\Delta$$

$$IRSLO=P_{SPT}-\Delta$$

Processing may then proceed to step S4, wherein a determination is made as to whether the one-push button has again been activated so as to provide another input from such one-push button. If the result of such determination is affirmative, processing may proceed to step S5 wherein the upper luminance limit IRSHI and the lower luminance limit IRSLO of the luminance gate mode may be returned to a default value and the mode may be returned to the normal intelligent mode. If, however, the determination of step S4 is negative, such determination is repeated.

Therefore, during operation of the one-push button described above, a target object may be positioned in the rectangular (SPOT) area located in the center of the imaged screen. Such positioning enables automatic iris control to be properly performed for the target object even during normal operations (such as when capturing images).

Thus, present color image pickup apparatus may include a level sensing unit having a number of level sensing or detecting devices including a first level sensing device for sensing an imaging output level of a specific luminance level area on an imaged screen and a second level sensing device for sensing an imaging output level of a skin tone area on the imaged screen. Such color image pickup apparatus may further include a control device for controlling the quantity of light received in a color image pickup unit in accordance with the sensed or detected output levels. Additionally, the present color image pickup apparatus may be operable in a plurality of exposure modes in which a respective exposure mode may be switched to or selected in accordance with the respective imaging condition which may be determined by the level sensing devices. As a result, an imaging output may be provided which has relatively high or excellent image quality.

In the present color image pickup apparatus, the level sensing unit may include a luminance converting circuit for converting a color imaging output signal from the color image pickup unit into a luminance signal. Based upon such luminance signal, the first level sensing device may sense or detect a luminance signal level of a specific luminance level area specified by a first area generating device. As a result, an imaging output level of the specific luminance level area on an imaged screen may be determined. Further, based upon color image signals and the luminance signal from the luminance converting circuit, the second level sensing device may sense or detect the signal level of the skin tone or color area specified by a second area generating device. As a result, an imaging output level of the skin tone or color area on the imaged screen may be determined. Furthermore, the control device may cause the sensing output or first average signal level produced by the first level sensing device, the sensing output or second average signal level produced by the second level sensing device, or a middle signal level between the first average signal level and the second average signal level to be adjusted to a predetermined level. Such operation may enable the control exposure mode to be switched according to the imaging condition. Additionally, the control device may cause the imaging output level of the specific area of the imaged screen produced by the second level sensing device to be adjusted to a predetermined level and may include a device for changing a setting(s) of the specific luminance area sensed by the first level sensing device so that the specific luminance level area may contain the imaging output level. Moreover, the control device may adjust the interior divisional point between the first average signal level and the second average signal level to the middle signal level and may adjust an area ratio of the specific luminance level area to the skin tone area to the interior divisional ratio. Such adjustment(s) may enable the exposure to be automatically controlled according to the condition of the target object. As a result, the present image pickup apparatus may perform proper automatic iris control for a target object so that an imaging output having relatively high or excellent image quality may be produced.

Although the control unit 60 of the present apparatus was described as having four integrator and four counters and as being operable in five modes, the present invention is not so limited. Instead, such control unit may have another number (s) of integrator and/or counters and may be operable in more or less than five modes.

Further, although the intelligent mode was described as a combination of the luminance gate mode and the skin tone mode, the present invention is not limited to such combination. Instead, other combinations of modes may also be utilized.

Furthermore, although the spot mode was described as utilizing a rectangular area, the spot mode is not so limited. Instead, areas having other shapes (such as circular, oval, square, and so forth) may also be utilized.

U.S. application Ser. No. 08/539,119 filed Oct. 4, 1995, and Japanese Application No. 3-277089 and corresponding Japanese Patent Abstract No. 91-277089 are hereby incorporated by reference.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An image pick-up apparatus comprising:

an image pick-up unit having means for receiving light representative of an image, means for converting light into a number of light signals, and means for controlling the amount of said light which is to be converted into the light signals in accordance with a control signal;

processing means for processing the light signals in a predetermined manner; and control signal generating means including luminance converter means and a plurality of determining means for receiving the processed light signals and for generating said control signal therefrom;

wherein said control signal generating means includes at least two determining means, and wherein each of said determining means includes an area generator for generating a signal indicative of a respective area, an integrator for integrating a luminance signal obtained from said luminance converter means over the respective area, and a counter for counting the number of pixels in the respective area.

2. An image pick-up apparatus according to claim 1, wherein the signal generated by the area generator of one of said determining means is indicative of one of a color area and a skin tone area of the respective image and the signal generated by the area generator of another of said determining means is indicative of a particular luminance level area of the respective image.

3. An image pick-up apparatus according to claim 2, wherein the signal generated by the area generator of third one of said determining means is indicative of the overall respective image and the signal generated by the area generator of a fourth one of said determining means is indicative of a center area of the respective image.

* * * * *